United States Patent
Gough et al.

(10) Patent No.: US 10,509,455 B2
(45) Date of Patent: *Dec. 17, 2019

(54) METHOD AND APPARATUS TO CONTROL A LINK POWER STATE

(71) Applicant: Intel Corporation, Santa Clara, CA (US)

(72) Inventors: Corey D. Gough, Hillsboro, OR (US); Ian M. Steiner, Hillsboro, OR (US); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,300

(22) Filed: Jan. 2, 2018

(65) Prior Publication Data

US 2018/0196488 A1    Jul. 12, 2018

Related U.S. Application Data

(63) Continuation of application No. 14/582,741, filed on Dec. 24, 2014, now Pat. No. 9,880,601.

(51) Int. Cl.
| | |
|---|---|
| *G06F 1/28* | (2006.01) |
| *G06F 13/42* | (2006.01) |
| *G06F 1/3228* | (2019.01) |
| *G06F 1/3234* | (2019.01) |
| *G06F 1/3296* | (2019.01) |
| *G06F 1/3287* | (2019.01) |

(52) U.S. Cl.
CPC .............. *G06F 1/28* (2013.01); *G06F 1/3228* (2013.01); *G06F 1/3253* (2013.01); *G06F 1/3287* (2013.01); *G06F 1/3296* (2013.01); *G06F 13/4282* (2013.01); *Y02B 70/12* (2013.01); *Y02B 70/123* (2013.01); *Y02D 10/14* (2018.01); *Y02D 10/151* (2018.01)

(58) Field of Classification Search
CPC ..... G06F 1/28; G06F 13/4282; Y02D 10/151; Y02D 10/14
See application file for complete search history.

(56) References Cited

U.S. PATENT DOCUMENTS

| | | | |
|---|---|---|---|
| 7,327,754 B2 * | 2/2008 | Mills | ...................... H04L 12/12 370/463 |
| 7,584,375 B2 | 9/2009 | Gutman et al. | |
| 7,647,517 B2 | 1/2010 | Tseng et al. | |
| 7,752,473 B1 | 7/2010 | Kwa et al. | |
| 8,151,059 B2 | 4/2012 | Sistla | |

(Continued)

OTHER PUBLICATIONS

International Search Report for Application PCT /US2015/061785 dated Feb. 29, 2016.

(Continued)

*Primary Examiner* — Vincent H Tran
(74) *Attorney, Agent, or Firm* — Schwabe, Williamson & Wyatt, P.C.

(57) ABSTRACT

A method is provided for controlling a link. This may include determining a condition of a first device coupled to the link, receiving, at the first device, a request for a specific link state from a second device coupled to the link, and determining a power state of the link based on the determined condition of the first device.

21 Claims, 7 Drawing Sheets

(56) References Cited

U.S. PATENT DOCUMENTS

| | | | |
|---|---|---|---|
| 8,738,950 B2 | 5/2014 | Cooper et al. | |
| 8,782,321 B2 | 7/2014 | Harriman et al. | |
| 8,831,666 B2 | 9/2014 | Cherukuri et al. | |
| 8,850,250 B2 | 9/2014 | Looi et al. | |
| 8,868,955 B2 | 10/2014 | Iyer et al. | |
| 8,880,923 B2 | 11/2014 | Saunders et al. | |
| 9,025,194 B2 | 5/2015 | Ueda | |
| 9,225,535 B2 | 12/2015 | Brock | |
| 9,880,601 B2* | 1/2018 | Gough | G06F 1/28 |
| 9,965,018 B1* | 5/2018 | Song | G06F 1/3237 |
| 2005/0149768 A1 | 7/2005 | Kwa et al. | |
| 2006/0184809 A1 | 8/2006 | Kojou et al. | |
| 2006/0271649 A1* | 11/2006 | Tseng | G06F 13/385 709/220 |
| 2007/0112995 A1 | 5/2007 | Manula et al. | |
| 2007/0150762 A1* | 6/2007 | Sharma | G06F 1/3203 713/300 |
| 2008/0288798 A1* | 11/2008 | Cooper | G06F 1/3228 713/322 |
| 2010/0058078 A1 | 3/2010 | Branover et al. | |
| 2010/0115312 A1* | 5/2010 | Conrad | H04W 52/28 713/320 |
| 2011/0072284 A1 | 3/2011 | Lyra et al. | |
| 2011/0172000 A1 | 7/2011 | Quigley et al. | |
| 2012/0204042 A1 | 8/2012 | Sistla et al. | |
| 2012/0254643 A1 | 10/2012 | Fetzer et al. | |
| 2013/0007483 A1* | 1/2013 | Diefenbaugh | G06F 1/3206 713/320 |
| 2013/0007489 A1* | 1/2013 | Unnikrishnan | G06F 1/3209 713/320 |
| 2013/0042126 A1 | 2/2013 | Ganesan et al. | |
| 2013/0132755 A1 | 5/2013 | Cooper et al. | |
| 2013/0283075 A1 | 10/2013 | Walsh | |
| 2014/0006673 A1 | 1/2014 | Varma et al. | |
| 2014/0006826 A1* | 1/2014 | Wagh | G06F 13/4282 713/323 |
| 2014/0019788 A1* | 1/2014 | Fang | G06F 1/3253 713/323 |
| 2014/0082242 A1* | 3/2014 | Murphy | G06F 13/24 710/263 |
| 2014/0149775 A1* | 5/2014 | Ware | G06F 1/3293 713/323 |
| 2014/0173166 A1 | 6/2014 | Chen et al. | |
| 2014/0189409 A1* | 7/2014 | Jeyaseelan | G06F 1/3253 713/324 |
| 2014/0208138 A1* | 7/2014 | Homchaudhuri | G06F 1/3209 713/320 |
| 2014/0310543 A1 | 10/2014 | Diefenbaugh et al. | |
| 2014/0365798 A1* | 12/2014 | Wen | G06F 1/3228 713/323 |
| 2015/0089259 A1 | 3/2015 | Warren et al. | |
| 2015/0095687 A1* | 4/2015 | Spry | G06F 1/3287 713/324 |
| 2016/0091957 A1* | 3/2016 | Partiwala | G06F 1/3243 713/323 |
| 2016/0231958 A1* | 8/2016 | Chin | G06F 1/3237 |

OTHER PUBLICATIONS

Written Opinion for Application PCT /US2015/061785 dated Feb. 29, 2016.
Kwa, Seh and Cohen, Debra T.: "PCI Express Architecture Power Management"; Nov. 8, 2002, pp. 1-14.
Non-Final Office Action dated Jun. 16, 2016 for U.S. Appl. No. 14/582,741, 11 pages.
Final Office Action dated Nov. 14, 2016 for U.S. Appl. No. 14/582,741, 19 pages.
Non-Final Office Action dated Apr. 4, 2017 for U.S. Appl. No. 14/582,741, 8 pages.
Final Office Action dated Jul. 6, 2017 for U.S. Appl. No. 14/582,741, 6 pages.
Notice of Allowance dated Sep. 12, 2017 for U.S. Appl. No. 14/582,741, 8 pages.
Extended European Search Report dated Aug. 3, 2018 for European Application No. 15873945.8, 6 pages.

* cited by examiner

METHOD AND APPARATUS TO CONTROL A LINK POWER STATE

CROSS REFERENCE RELATED TO APPLICATIONS

The present application is a continuation of U.S. patent application Ser. No. 14/582,741, filed Dec. 24, 2014, entitled "METHOD AND APPARATUS TO CONTROL A LINK POWER STATE," the entire disclosure of which is hereby incorporated by reference in its entirety.

FIELD

Embodiments may relate to link power states and/or link power management.

BACKGROUND

Electronic systems, such as network systems, computer systems and mobile terminals, may be made up of components that communicate with one another for various purposes. Communication may be provided using Peripheral Component Interconnect (PCI) or Peripheral Component Interconnect Express (PCIe). Links that interconnect components may provide a mechanism for transferring data. As one example, PCI Express (or PCIe) is a high-speed serial expansion bus standard based on point-to-point topology with separate serial links connecting each PCIe device to a host device (such as another PCIe device).

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
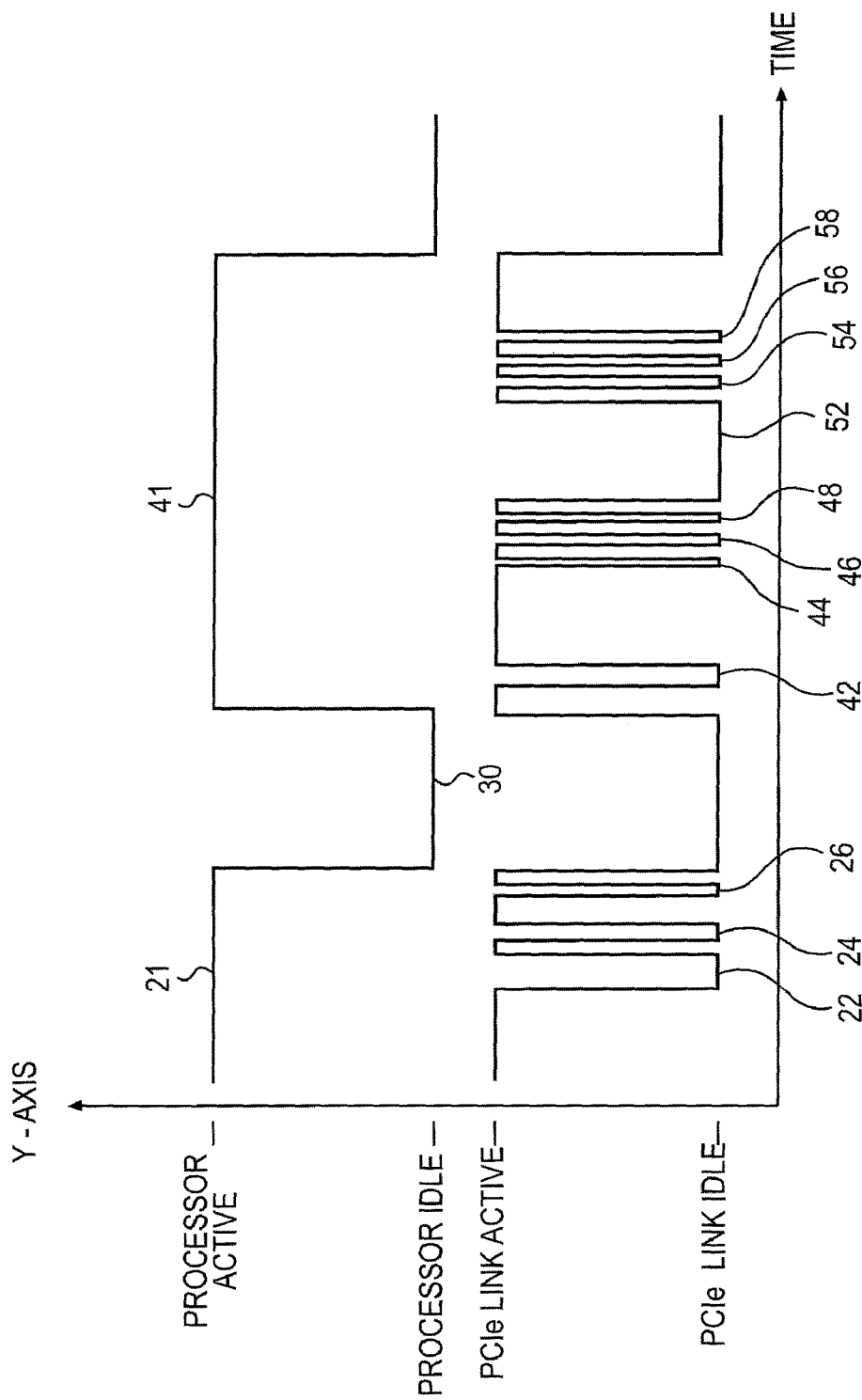
FIG. 1 is a graph showing an operating state of a processor (over time) and an operating state of a PCIe link (over time) according to an example arrangement.

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may be described with respect to a PCIe link between two PCIe devices. The PCIe device may be a PCIe endpoint, a switch device, a PCIe root complex device, etc. In the following, the PCIe link may be described as being between a processor (i.e., an upstream device) and a downstream device. Other types of links and/or devices may also be provided.

Embodiments may be applicable to an electronic system and/or electronic device. The electronic system and/or electronic device may be any one of a mobile terminal, a mobile device, a mobile computing platform, a mobile platform, a server, a laptop computer, a tablet, an ultra-mobile personal computer, a mobile Internet device, a smartphone, a personal digital assistant, a display device, a television (TV), etc.

Embodiments may relate to an electronic system and/or electronic device, which may also be referred to as a platform. The platform may include hardware and software. A processor may be a component of the platform.

Embodiments may include a Peripheral Component Interconnect (PCI) Express (PCIe) link between two devices, such as a PCIe device and a host device (also a PCIe device). The PCIe device may be considered a downstream device, and the host device may be considered an upstream device. Each PCIe device may include a PCIe port.

PCIe devices may communicate via the link (or the interconnect). The link is a point-to-point communication channel between two PCIe ports allowing the ports to send/receive PCI-requests (configuration read/write, input/output (I/O) read/write, memory read/write) and interrupts. The PCIe link between two devices may include from 1 to 32 lanes, for example. A lane may include two differential signaling pairs: a first pair for receiving data, and a second pair for transmitting data. Other numbers of lanes may also be provided.

The PCIe link may utilize a link (or active) state power management that lowers power consumption when the link (or interconnect) is not active. Link state power management may be part of PCI Express Active State Power Management (ASPM). For example, link states of the PCIe device may be converted from L0 (on) to L1 (off) when the link is not transferring data. The hardware may be automatically converted back to L0 when data is available for transfer over the link.

L1 is a link state having a low exit latency. The L1 state (or L1 power state) may reduce power consumption, and may be requested when a PCIe device becomes aware of a lack of outstanding requests and/or pending transactions. L0 is a link state having a very low exit latency. The L0 state (or L0 power state) may reduce power wastage during short intervals between link activities.

Embodiments may also be applicable to control PCIe power and performance states other than L1. For example, embodiments may be applicable to PCIe L1 (and all sub-states), PCIe L2/L3 ready states, PCIe L2 state and/or PCIe Dynamic Link Width (DLW) and/or etc.

As one example, DLW is an ability to dynamically reconfigure a width of a PCIe link. A x8 PCIe device may be dynamically configured to only use 4 of the 8 lanes. Link reduction may be performed in order to save power.

Arrangements and embodiments may be described hereinafter with respect to the L1 link state. However, embodiments may also be applicable to the L0 state and/or other power or performance states.

The L1 state may be activated on the PCIe link when there are no outstanding requests or pending transactions. One advantage of using the L1 state is for power savings on idle links. However, one disadvantage of using the L1 state is an amount of time to exit from the L1 state (i.e., the exit latency). The L1 exit latency may cause an increase in transaction response time.

Entry into the L1 state may be initiated by a downstream device (such as a PCIe device) when the downstream device has been idle for a prescribed amount of time. The PCIe device may be any of a number of different devices, such as a network storage device, a power management device, a network card, a network controller (i.e., a card), a storage controller, a graphics controller, a management controller, etc. As one example, a downstream device may provide a L1 state request (or L1 request) when the PCIe device has been idle for a prescribed time, such as for 32 nanoseconds. The prescribed time may be a different amount of time.

The host device (or upstream PCIe device) may receive, on the link, a request for the L1 state, and the host (or upstream PCIe device) may accept (grant) or reject (deny) the L1 request. The host device may include a PCIe root complex device in a chipset or a central processing unit (CPU). The host device may be server and/or a processor (or CPU). In disadvantageous arrangements, an amount of time to enter the L1 state (i.e., the L1 entry) and an amount of time to exit the L1 state (i.e., the L1 exit) may occur independently of activity at the host device (such as a processor).

One disadvantage may be frequent time periods of short activity followed by short time periods of inactivity on PCIe devices. This may result in a high number of L1 exits and an unacceptable increase in transaction response times.

Arrangements may disable an ability to enter the L1 state (for PCIe) in order to avoid a latency impact. While disabling use of the L1 state may eliminate the latency impact, the disabling of the L1 state may increase platform idle power. The power increase (from the disabling of the L1 state) may be from the PCIe links and based on other platform components (such as a processor and a platform controller hub) that may not reach their lowest idle power states until all downstream devices are in the L1 state. The disabling use of the L1 state may increase platform power when idle or when active. The disabling use of the L1 state may increase power of the platform (or processor), but may also increase device power and prevent memory voltage regulator (VR) phase shedding.

The processor (or platform) may have the ability to determine, at any time, if the L1 state has the potential to impact performance or not. The processor (or platform) may also determine if the L1 exit latency may be hidden behind other power management actions, such as a c-state wake event. For example, the c-state wake event may occur when a number of resources on a processor (or platform) transition from an idle state to an active state. Actions may be taken following a c-state wake event before execution may resume. If the latency of these actions exceed the L1 exit latency, then the L1 exit latency may be hidden based on the other actions.

The processor (or platform) may make determinations based on global idle conditions or other indicators of platform activity that exist on the processor and/or platform. For example, a global idle condition (or other indicator of platform activity) may exist when components of a platform are able to enter a c-state (or platform c-state). For example, when a platform is able to enter a c-state (or platform c-state), transactions not being processed by the platform may all be in an inactive state (or inactive condition). The L1 exit latency during such conditions may be hidden behind other platform actions, such as ramping voltages or waking up memory and cores.

Embodiments may use global idle condition information to determine use of the PCIe L1 state (or PCIe L1 power states). Embodiments may also use information or other indicators of platform activity to determine use of the PCIe L1 state.

Embodiments may provide a high performance method to control link power states. Embodiments may restrict use (or deny use) of the L1 state (or PCIe L1 power state) to only time periods when the L1 state will not impact package performance (or system performance). Embodiments may provide the idle power benefit of the PCIe L1 state without having a performance impact.

Embodiments may determine a condition of a first device (such as a processor or a platform) coupled to a link. The first device may receive a request for a specific link state from a second device (i.e., a downstream device). The first device may determine a power state of the link based on the determined condition of the first device. For example, the first device may determine a power off state of the link based on the determined idle condition of the first device. On the other hand, the first device may determine a power on state of the link based on the determined active condition of at least one component of the first device.

The host device may be a processor (or a central processing unit (CPU)). Microcode (or CPU microcode) hardware, circuitry and/or logic may be provided within the platform (or processor) for coordinating when the L1 state can be used (or not used) based on global idle conditions or other indicators of platform activity (or processor activity). As one example, microcode, hardware, circuitry and/or logic may be provided within a microcontroller of the processor. The microcontroller may operate by monitoring the global idle conditions (or other indicators of platform activity) and negotiating c-states, such as with other processors as well as a platform controller hub (PCH) and/or chipset. Eventually, if all links from the upstream device enter the L1 state, then the microcontroller (or CPU) may take additional actions to save power (i.e., entering into a deeper c-state). However, when the global idle conditions (or other indicators) no longer exist (i.e., exiting a c-state), then the microcontroller (or CPU) may disable use of the L1 state by configuring upstream components (such as the processor) to reject L1 requests from the downstream devices.

Control mechanisms may be implemented in whole or in part by microcode, hardware, circuitry and/or logic.

In at least one embodiment for a PCIe link coupled to a downstream device and to an upstream device (such as the processor), microcode, hardware, circuitry and/or logic may enable use (allow) or disable (deny) use of the L1 state in the host device (or the upstream component such as the processor). In at least one embodiment for the PCIe link coupled to a downstream device and to an upstream device (such as the CPU), microcode, hardware, circuitry and/or logic may enable use (allow) or disable use (deny) of the L1 state in the processor. The processor may be made aware of use of the L1 state based on global idle entry and/or exit messages provided by the processor (or CPU).

FIG. 1 is a graph showing an operating state of a processor (over time) and an operating state of a PCI link (over time) according to an example arrangement. Other arrangements may also be provided.

FIG. 1 shows an operating state of a processor changing between an active state (or active condition) and an inactive state (or idle condition). FIG. 1 shows the active state being a higher state on a y-axis (or illustrated as being higher in FIG. 1) and the idle state being a lower state on the y-axis (or illustrated as being lower in FIG. 1).

FIG. 1 also shows an operating state of a PCI link changing between an active state (or active condition) and an inactive state (or idle condition). FIG. 1 shows the active state being a higher state on the y-axis (or illustrated as being higher in FIG. 1) and the idle state being a lower state on the y-axis (or illustrated as being lower in FIG. 1).

FIG. 1 shows the PCI link being in an active state (or active condition). For example, FIG. 1 shows the processor in an active state (or active condition) during a time period 21, in an inactive state (or inactive condition) during a time period 30 and in an active state during a time period 41. The inactive state may also be called an idle state or idle condition.

FIG. 1 also shows that the PCI link may be in an idle state (or idle condition) at different time points (such as time periods 22, 24 and 26) while the processor is in the active state (such as at the time period 21). FIG. 1 also shows that the PCI link may be in the idle state (or idle condition) at other time points (such as time periods 42, 44, 46, 48, 52, 54, 56 and 58) while the processor is in the active state (such as at the time period 41).

FIG. 1 also shows that the L1 state entry of the PCI link may be independent of the processor activity. Thus, frequent L1 exits of the PCI link while the processor is active may cause performance impact.

Figure 2:
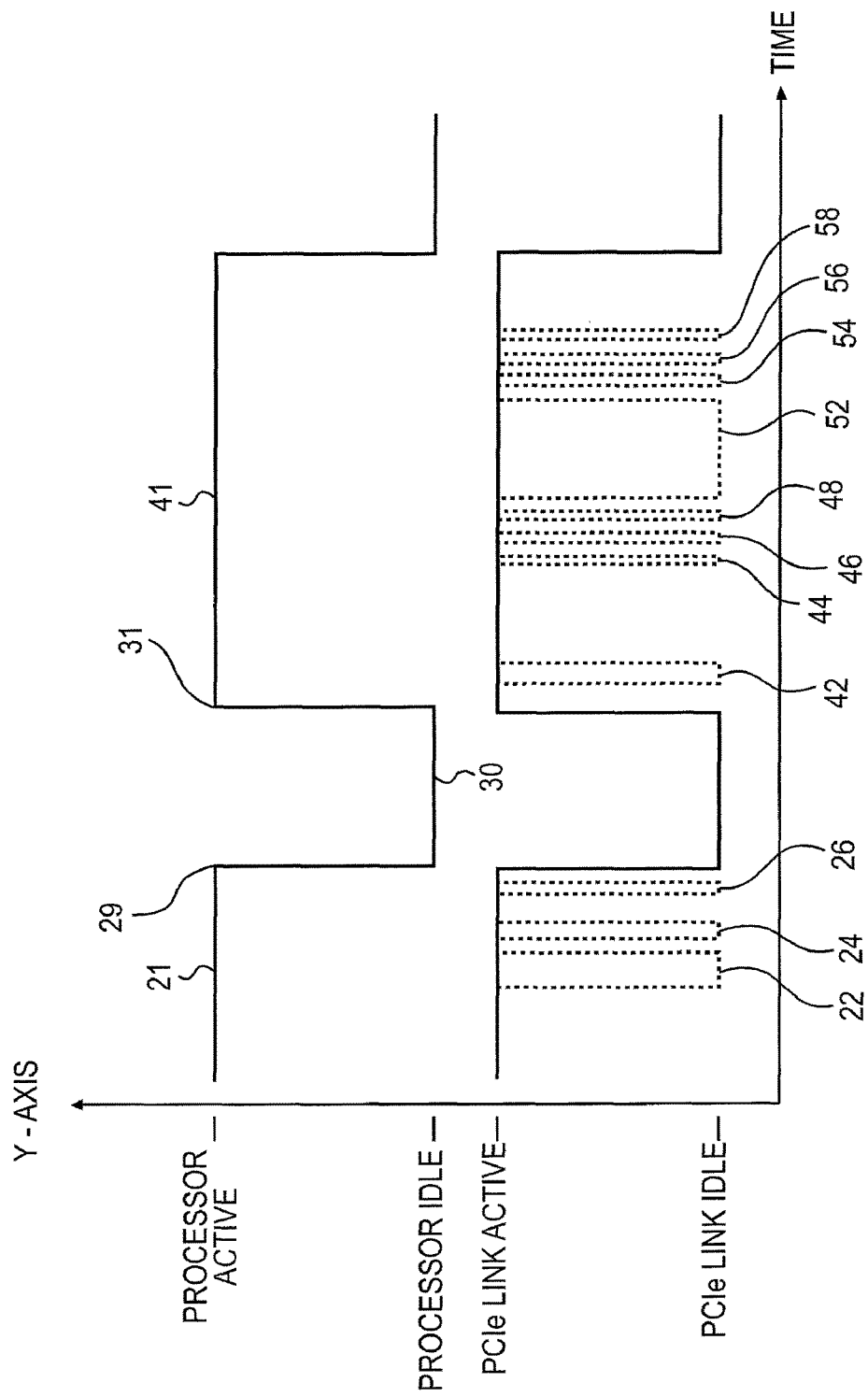
FIG. 2 is a graph showing an operating state of a processor (over time) and an operating state of a PCIe link (over time) according to an example embodiment.

FIG. 2 is a graph showing an operating state of a processor (over time) and an operating state of a PCI link (over time) according to an example embodiment. Other embodiments and configurations may also be provided.

FIG. 2 shows an operating state of a processor changing between an active state (or active condition) and an inactive state (or idle condition). FIG. 2 shows the active state being the higher state on the y-axis (or illustrated as being higher in FIG. 2) and the idle state being the lower state on the y-axis (or illustrated as being lower in FIG. 2).

FIG. 2 also shows an operating state of a PCI link changing between an active state (or active condition) and an inactive state (or idle condition). FIG. 2 shows the active state being the higher state on the y-axis (or illustrated as being higher in FIG. 2) and the idle state being the lower state on the y-axis (or illustrated as being lower in FIG. 2).

FIG. 2 shows the processor in the active state (or active condition) during the time period 21, in the inactive state (or inactive condition) during the time period 30, and in the active state (or active condition) during the time period 41. FIG. 2 also shows that the inactive state (or inactive condition) during the time period 30 occurs between a time point 29 and a time point 31.

Embodiments may determine that global idle conditions (or other indicators of platform activity) occur between the time point 29 and the time point 31. For example, activity of the processor may be inactive (or idle condition) between the time point 29 and the time point 31. Embodiments may permit an L1 state entry between the time point 29 and the time point 31 (when the global idle conditions or other indicators exist). Embodiments may also permit the L1 state entry only during global idle conditions (or other indicators), such as when the package (or system) is able to enter a c-state (or platform c-state).

In this example arrangement, the downstream device may request the L1 state entry at time periods 22, 24, 26 (when the downstream device is idle). However, the upstream device may not grant the L1 state entry requests because the processor is active (or active condition) during the time period 21.

Similarly, the downstream device may request the L1 state entry at time periods 42, 44, 46, 48, 52, 54, 56 and 58 (when the downstream device is idle or in idle condition). However, the upstream device may not grant the L1 state entry requests because the processor is active (or active condition) during the time period 41.

FIG. 2 shows that while the processor is active (such as during the time periods 21 and 41), the L1 state requests are denied and the respective PCIe link remains at the L0 state. That is, the downstream device may request the L1 state (during the time periods 21 and 41), but the L1 state request is denied when the upstream device is active (or active condition).

Figure 3A:
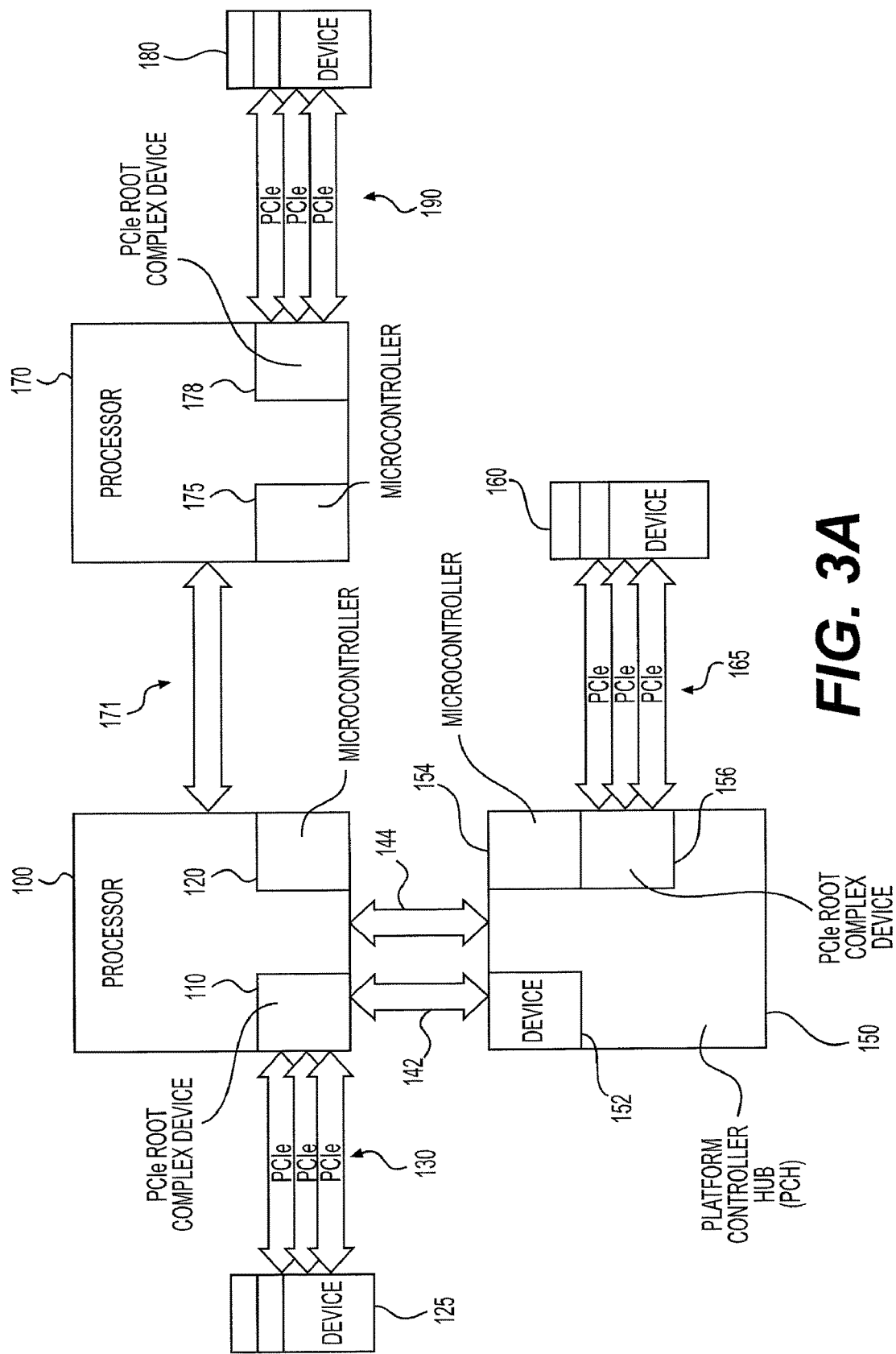
FIG. 3A shows an electronic system according to an example embodiment.

FIG. 3A shows an electronic system according to an example embodiment. Other embodiments and configurations may also be provided. FIG. 3 may also be referred to as a platform and/or an electronic device.

The electronic system (or platform) shows a first processor 100 (or CPU), a downstream device 125 (or a plurality of downstream devices), a platform controller hub (PCH) 150 (or a chipset), a downstream device 160 (or a plurality of downstream devices), a second processor 170 (or CPU) and a downstream device 180 (or a plurality of downstream devices). Other configurations of the system (or platform) may also be provided.

The processor 100 may be called a first device, and one of the downstream devices may be called a second device.

A PCIe interconnect 130 (having links) is coupled between the processor 100 and the downstream device 125. A PCIe interconnect 165 (having links) is coupled between the platform controller hub (PCH) 150 (or the chipset) and the downstream device 160. A PCIe interconnect 190 (having links) is coupled between the processor 170 and the downstream device 180. Other configurations may also be provided.

The PCIe interconnect 130 may include one or more links (PCIe links) between the processor 100 and the one or more downstream devices 125. The PCIe interconnect 165 may include one or more links (PCIe links) between the platform controller hub (PCH) 150 (or the chipset) and the one or more downstream devices 160. The PCIe interconnect 190 may include one or more links (PCIe links) between the processor 170 and the one or more downstream devices 180.

The processor 100 may be a central processing unit (CPU). The processor 100 may include a PCIe root complex device 110 and a microcontroller 120. The PCIe root complex device 110 may generate transaction requests on behalf of the processor 100. As one example, the PCIe complex device 110 may be a PCI controller.

The PCIe root complex device 110 may contain one or more PCIe ports to couple to the PCIe link (or links) of the interconnect 130. The PCIe root complex device 110 may allow (or grant) PCIe L1 state requests and deny PCIe L1 state requests.

The processor 100 may be coupled to the processor by a link 171. The processor 170 may be a CPU. The processor 170 may include a microcontroller 175 and a PCIe root complex device 178. The PCIe root complex device 178 may generate transaction requests on behalf of the processor 170. As one example, the PCIe root complex device 178 may be a PCI controller. The PCIe root complex device 178 may contain one or more PCIe ports to couple to the PCIe link (or links) of the interconnect 190. The PCIe root complex device 178 may allow (or grant) PCIe L1 state requests and deny PCIe L1 state requests.

The processor 100 may also be coupled to the platform controller hub (PCH) 150 (or to the chipset) via a first link 142 and a second link 144.

The PCH 150 may include a device 152 (within the PCH 150), a microcontroller 154 and a PCIe root complex device 156 (or PCI controller). The PCH 150 or chipset may include a PCIe device (such as the device 152). For example, the PCIe device 152 may be directly coupled to the PCIe root complex device 110 (of the processor 100) via the first link 142. The PCIe device 152 may be an integrated network controller (in the PCH or the chipset). The PCH 150 may also communicate data with the processor 100 using the second link 144.

Figure 3B:
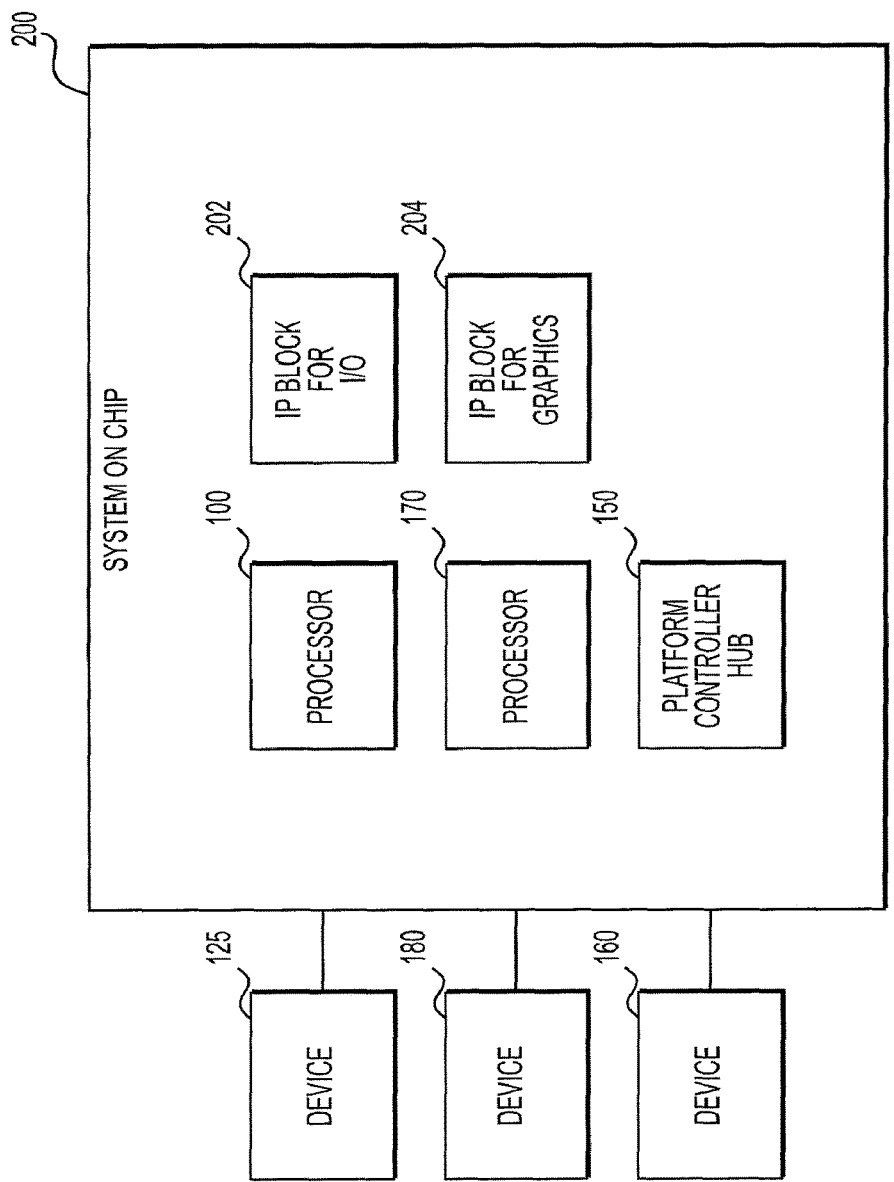
FIG. 3B shows a system on chip according to an example embodiment.

FIG. 3B shows a system on chip (SOC) according to an example embodiment. Other embodiments and configurations may also be provided. The system on chip (SOC) may be a component of an electronic system or an electronic device.

The system on chip (SOC) 200 may include a silicon chip, and may include a plurality of intellectual property (IP) blocks provided on the silicon chip. The SOC 200 may be an integrated circuit (IC) that integrates components of an electronic system into a single silicon chip. The SOC 200 may contain digital, analog, mixed-signal, and radio-frequency functions. The SOC 200 may include both hardware (processors, controllers, memory, voltage regulators, etc.), and software for controlling the hardware.

As one example and for ease of description, FIG. 3B shows the SOC 200 includes the processor 100, the processor controller hub (PCH) 150 and the processor 170. The SOC 200 may also include an IP block for Input/Output (I/O) 202 and an IP block for Graphics 204, for example. Other IP blocks may be used such as IP blocks for audio, imaging, video, etc.

FIG. 3B shows the SOC 200 with PCIe devices located off-chip Downstream devices may also be provided outside the SOC 200. For example, the downstream device 125 may be coupled to the SOC 200 via a PCIe link, the downstream device 180 may be coupled to the SOC 200 via a PCIe link, and the downstream devices 160 may be coupled to the SOC 200 via a PCIe link.

In at least one embodiment, the SOC may be coupled to a multi-chip package (MCP) (having the PCIe device) that is coupled using PCIe protocol. In at least one embodiment, the SOC may have the PCIe device integrated onto a same die as the SOC, and the PCIe device may be connected using PCIe protocol (including L1).

Figure 4:
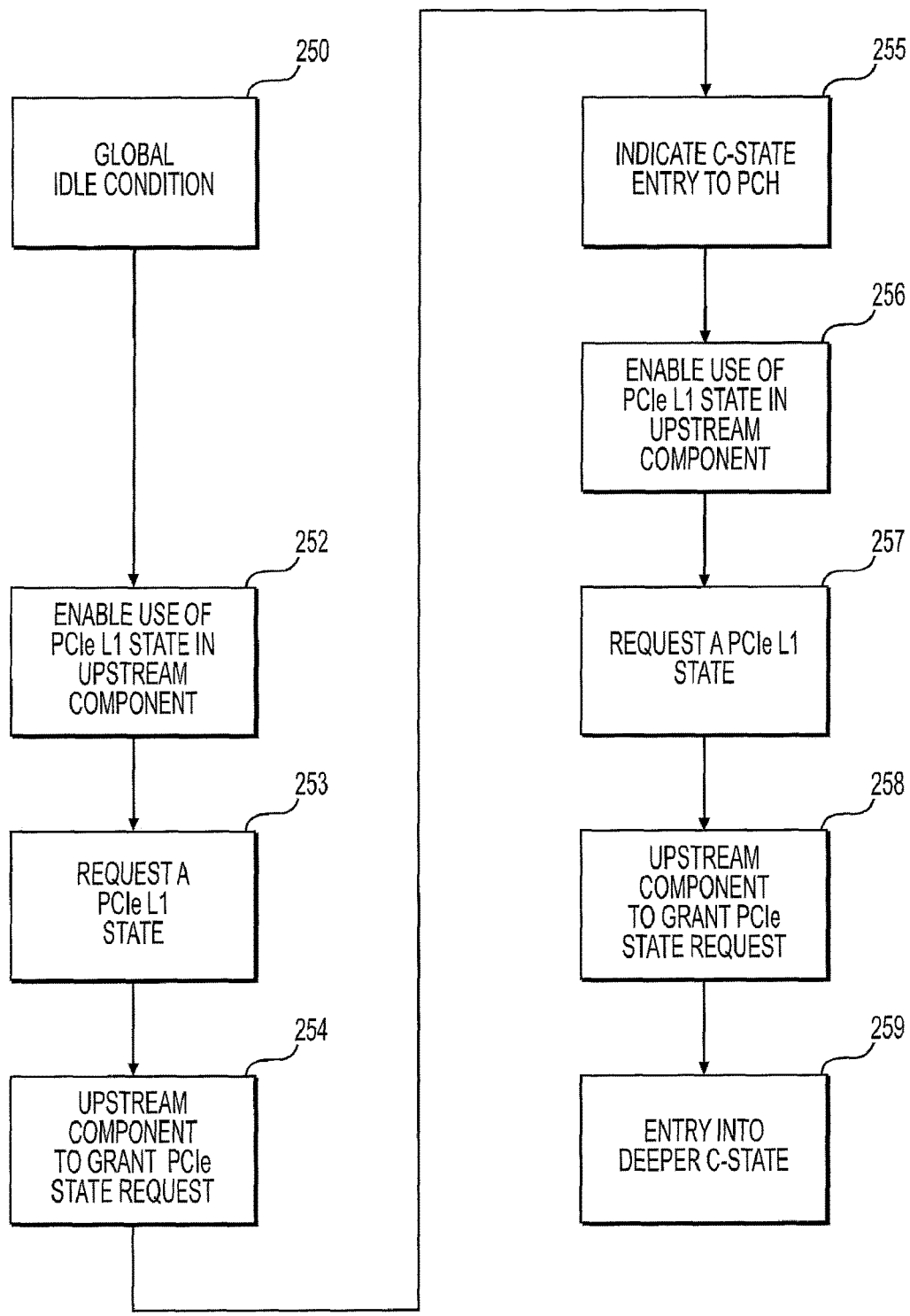
FIG. 4 is a flowchart showing link power management operations according to an example embodiment.
Figure 5:
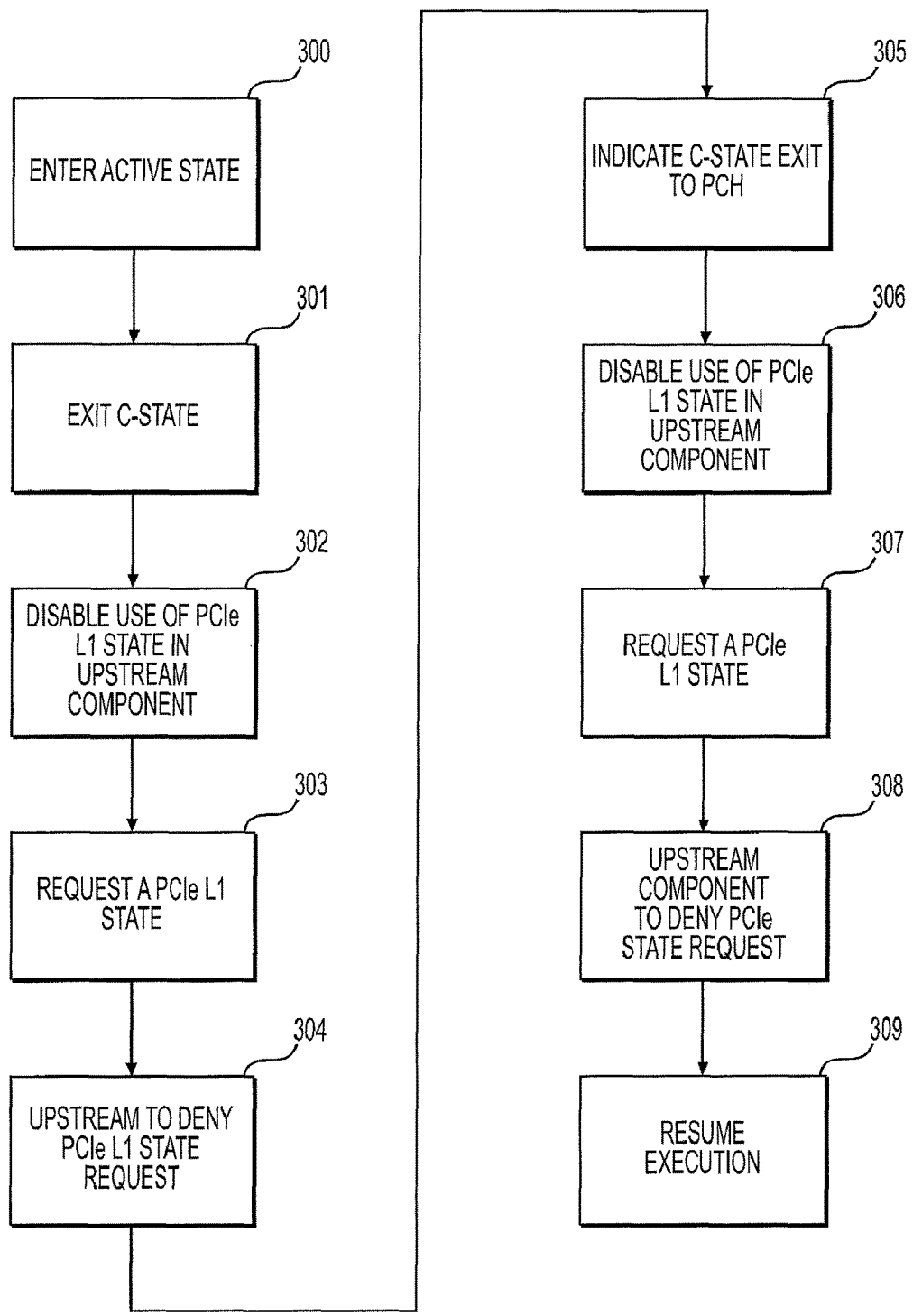
FIG. 5 is a flowchart showing link power management operations according to an example embodiment.

FIGS. 4 and 5 relate to link power management operations. For ease of description, the operations will be described with respect to the electronic system (or platform) shown in FIG. 3A. FIG. 4 shows that when global idle conditions are met (such as the processor 100 is in idle condition), then a sequence of operations may take place.

FIG. 4 is a flowchart showing link power management operations according to an example embodiment. Other operations, orders of operations and embodiments may also be provided. The following flowchart may relate to an electronic system, such as a system that includes a processor attached to a PCIe link and/or a system that includes a platform controller hub (PCH) or chipset attached to a PCIe link.

The link power management operations of FIG. 4 relate to the processor 100 being in a global idle condition (i.e., the processor is in an idle condition or inactive state). The link power management operations of FIG. 5 relate to the processor 100 no longer being in a global idle condition (i.e., the processor is in an active condition or state).

The global idle condition may be predetermined based on a specific system (or platform). The global idle condition may be when one or more platform resources are simultaneously idle (or in simultaneous idle condition). As one example, global idle conditions may occur when all cores of a platform are simultaneously idle, when all cores and a memory are simultaneously idle (or in simultaneous idle condition), and/or when all cores, a memory and a chipset are simultaneously idle (or in simultaneous idle condition). The criteria for a global idle condition may vary from system to system (or from platform to platform).

As shown in FIG. 4, in operation 250, a global idle condition may be provided. This may occur when activity is stopped (or is idle) for cores of the processor 100, for example. As discussed above, the global idle condition may occur based on other criteria. The global idle condition may occur when the processor 100 (or platform) is idle.

A condition of the processor 100 (or first device) coupled to the link may be determined. The microcontroller 120 (of the processor 100) may determine that the processor 100 is in an idle condition (or inactive). As one example, the microcontroller 120 may determine that the platform is ready for a c-state entry (such as a package c-state entry). Other specific actions may be provided when the global idle condition is determined.

In operation 252, based on the global idle condition, the microcontroller 120 may enable use (allow) of the PCIe L1 state. The microcontroller 120 may provide enabling information to the PCIe root complex device 110 (of the processor 100).

In operation 253, one of the downstream devices 125 may request a PCIe L1 state. For example, one of the downstream devices 125 may provide a request for a PCIe L1 state (or PCIe L1 state request) to the processor 100. The request may be provided when the downstream device 125 is determined to have been idle for a prescribed amount of time. Operation 253 relates to a PCIe device providing a request to an upstream device, such as processor (for a processor attached link), a PCH (for a PCH attached link), and/or etc. The processor (or first device) may receive the request for a specific link state from the downstream device (or second device).

In operation 254, the upstream component may grant the PCIe L1 state request (sent by the downstream device 125). For example, the PCIe root complex device 110 may grant (allow) the L1 state request (from one of the downstream devices 125) since a global idle condition exists.

The processor 100 may determine the power state of the link based on the determined condition of the processor (or first device). As one example, the processor 100 may determine a power state of the link based on the determined idle condition of the processor (or first device).

The microcontroller 120 may indicate the c-state entry (or package c-state entry) to the PCH 150 in operation 255. Operation 255 may occur at any time in which the processor 100 (or package) is to enter into the c-state (or the package c-state).

In operation 256, the microcontroller 154 (of the PCH 150) may enable use of the PCI L1 state. The microcontroller 154 may provide enabling information to the PCIe root complex device 156 (of the PCH 150).

In operation 257, one of the downstream devices 160 may request a PCIe L1 state. For example, one of the downstream devices 160 may provide a request for PCIe L1 state (or PCIe L1 state request) to the PCH 150. The request may be provided when the downstream device 160 is determined to have been idle for a prescribed amount of time.

In operation 258, the upstream component (such as the PCI root complex device 156) may grant (allow) the PCIe L1 state request (sent by the downstream device 160). For example, the PCIe root complex device 156 may grant (allow) the L1 state request (from one of the downstream devices 160).

In operation 259, the microcontroller 120 (of the processor 100) may perform an operation to enter into a deeper c-state. For example, components may enter into a deeper c-state (such as a deeper package c-state). As one example, a package c-state entry may include a set of actions to save power (such as save power across the platform).

At any time during the operations of FIG. 4, the processor 100 may enter into the active state (or active condition). For example, while in a c-state (such as a package c-state), activity of the PCIe device may cause an interrupt which may cause a waking up of the processor 100. When the activity resumes, then global idle conditions are no longer met, and the operations set forth in FIG. 5 may be performed.

FIG. 5 is a flowchart showing link power management operations according to an example embodiment. Other operations, orders of operations and embodiments may also be provided. The flowchart may relate to an electronic system, such as a system that includes a processor attached to a PCIe link and/or a system that includes a platform controller hub (PCH) or chipset attached to a PCIe link.

The link power management operations of FIG. 5 relate to the processor 100 (or first device) no longer being in a global idle condition (i.e., the processor is in an active state).

As shown in FIG. 5, in operation 300, an interrupt condition may be provided. This may occur when activity occurs for at least one of the cores of the processor 100, for example. As one example, an interrupt signal may be provided to a processor indicating that an event has occurred and needs to be handled. An interrupt may be received by the processor, and may cause at least one core to wake up (i.e., transition from idle to active state). The interrupt may be generated by a network controller, a storage controller, etc. The lack of the global idle condition may occur when the processor 100 (or platform) is active (such as at least one core is in an active condition).

In operation 301, the microcontroller 120 may perform exiting of the c-state (such as the package c-state). The microcontroller 120 may take actions associated with transitioning the processor (or platform) from the global idle condition (or state) to an active condition (or state) (waking up at least one of the cores, waking up platform interconnects, restoring power to caches, waking up memory, and/or etc.). The waking up may refer to transitioning a resource from an idle condition to an active condition.

In operation 302, the microcontroller 120 may disable use of the PCIe L1 state. The microcontroller 120 may provide disabling information to the PCIe root complex device 110 (of the processor 100).

In operation 303, one of the downstream devices 125 may request a PCIe L1 state. For example, one of the downstream devices 125 may provide a request for a PCIe L1 state (or PCIe L1 state request) to the processor 100. The request may be provided when the downstream device 125 is determined to have been idle for a prescribed amount of time. Operation 303 relates to a PCIe device providing a request to an upstream device, such as a processor (for a processor attached link), a PCH (for a PCH attached link), and/or etc.

In operation 304, the upstream component may deny the PCIe L1 state request (sent by the downstream device 125). For example, the PCIe root complex device 110 may deny the L1 state request (from one of the downstream devices 125).

The microcontroller 120 may indicate the c-state exit (or package c-state exit) to the PCH 150 (or other component) in operation 305. Operation 305 may occur at any time in which the processor 100 (or platform) is to exit the c-state (or the package c-state).

In operation 306, the microcontroller 154 (of the PCH 150) may disable use of the PCI L1 state. The microcontroller 154 may provide disabling information to the PCIe root complex device 156 (of the PCH 150).

In operation 307, one of the downstream devices 160 may request the PCIe L1 state request. For example, one of the downstream devices 160 may provide a request for PCIe L1 state (or PCIe L1 state request) to the PCH 150. The request may be provided when the downstream device 160 is determined to have been idle for a prescribed amount of time.

In operation 308, the upstream component (such as the PCIe root complex device 156) may deny the PCIe L1 state request (sent by the downstream device 160). For example, the PCIe root complex device 156 may deny the L1 state request (from one of the downstream devices 160).

In operation 309, the microcontroller 120 (of the processor 100) may perform an operation to resume execution. For example, the processor may resume the executing of instructions.

When the platform is active, then the PCIe inactivity may not result in the PCIe links going to the L1 state. The links may remain in the L0 state since all requests for the PCIe L1 state will be denied.

Figure 6:
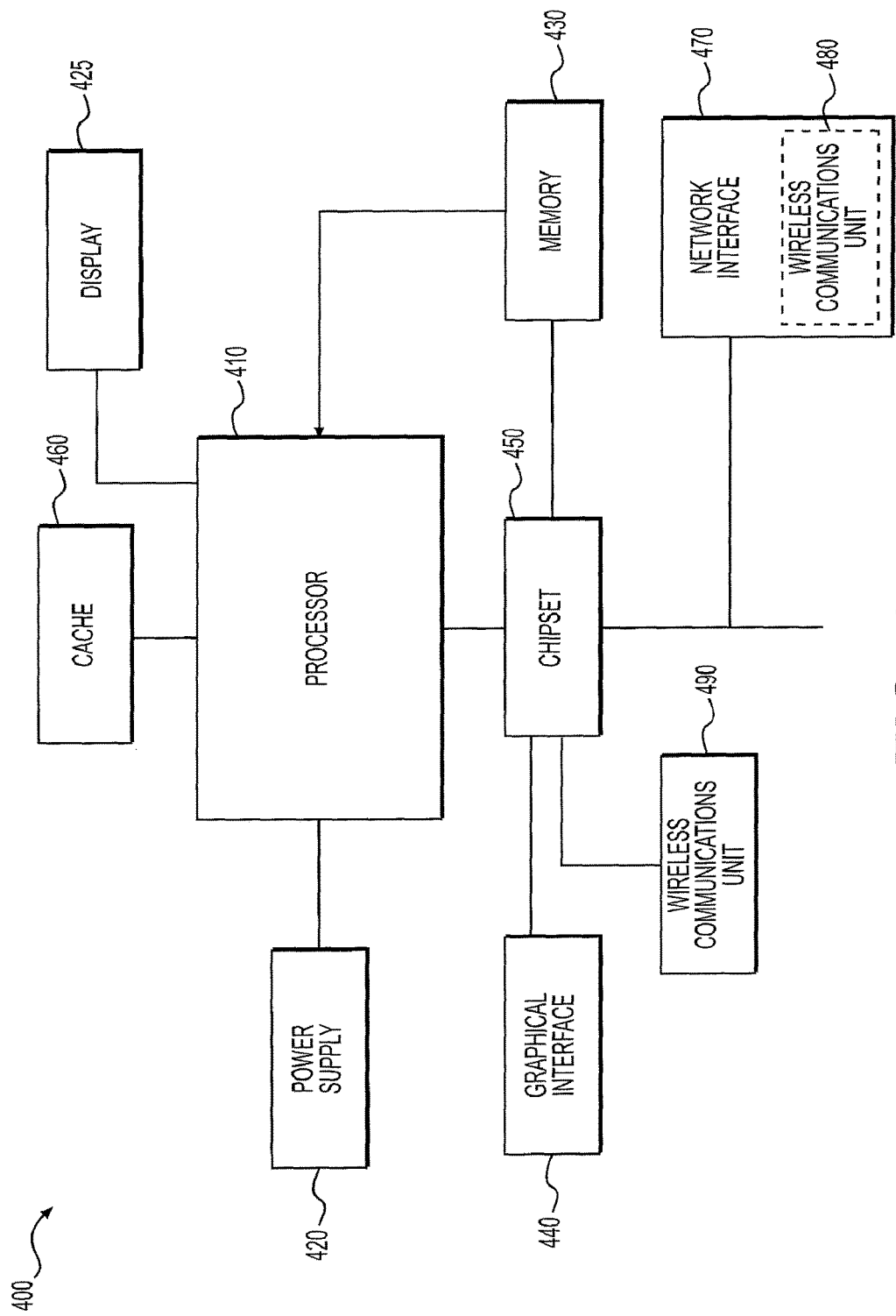
FIG. 6 shows an electronic system according to an example arrangement.

FIG. 6 shows an electronic system according to an example embodiment. Other embodiments and configurations may also be provided. The electronic system is provided to show components of a system that may operate as discussed above.

FIG. 6 shows a system 400 that includes a processor 410, a power supply 420, a display 425 and a memory 430. The processor 410 may include an arithmetic logic unit and an internal cache, for example. The processor 410 may perform operations by using received instructions, such as instructions received via a computer-readable medium (or machine-readable medium). The processor 410 may correspond to any previously described processor.

The above-described features may be provided within the electrical system 400 shown in FIG. 6.

The system 400 may also include a graphical interface 440, a chipset 450, a cache 460, a network interface 470 and a wireless communication unit 480, which may be incorporated within the network interface 470. Alternatively or additionally, a wireless communications unit 490 may be coupled to the processor 410, and a direct connection may exist between the memory 430 and the processor 410.

The processor 410 may be a CPU, a microprocessor or any other type of processing or computing circuit and may be included on a chip die with all or any combination of the remaining features, or one or more of the remaining features may be electrically coupled to the microprocessor die through known connections and interfaces. The connections that are shown are merely illustrative as other connections between or among the elements depicted may exist depending, for example, on chip platform, functionality, or application requirements.

In at least one embodiment, the processor 410 may be provided on a chip, such as a system on chip as discussed above with respect to FIG. 3B. The processor may include components such as a memory controller and a graphics device, etc.

In at least one embodiment, a computer-readable medium (or machine-readable medium) may store a program for controlling circuitry to control a power state of a PCIe link. The circuitry may be controlled to control the L1 state of the link. The program may be stored in a system memory, which may be internal or external to the processor, for example. The program may include instructions or code.

Instructions or code executed by the processor may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus embodiments are not limited to any specific combination of hardware circuitry and software instructions.

The program may include code or instructions to perform any of the operations or functions performed in embodiments previously discussed above.

Features of the above described embodiments may be provided in code segments or instructions to perform tasks. The code segments or tasks may be stored in a processor readable medium (or machine-readable medium) or transmitted by a computing data signal in a carrier wave over a transmission medium or communication link. The processor readable medium, machine readable medium and/or computer readable medium may include any medium that can store or transfer information.

The following examples pertain to further embodiments.

Example 1 is a method of controlling a link comprising: determining a condition of a first device coupled to the link, receiving, at the first device, a request for a specific link state from a second device coupled to the link, and determining a power state of the link based on the determined condition of the first device.

In Example 2, the subject matter of Example 1 can optionally include determining the condition of the first device includes determining an idle condition of the first device.

In Example 3, the subject matter of Example 1 and Example 2 can optionally include determining the power state includes determining a power off state of the link based on the determined idle condition of the first device.

In Example 4, the subject matter of Example 1 can optionally include determining the condition of the first device includes determining an active condition of at least one component of the first device.

In Example 5, the subject matter of Example 1 and Example 4 can optionally include determining the power state includes determining a power on state of the link based on the determined active condition of at least one component of the first device.

In Example 6, the subject matter of Examples 1-5 can optionally include the link is a Peripheral Component Interconnect Express (PCIe) link.

In Example 7, the subject matter of Example 1 and Example 6 can optionally include the first device includes a processor.

In Example 8, the subject matter of Example 1 and Example 7 can optionally include the processor includes a PCIe root complex device.

In Example 9, the subject matter of Examples 1-8 can optionally include controlling power to the link based on the determined power state of the link.

In Example 10, the subject matter of Examples 1-9 can optionally include the power state of the link is a power off state of the link or a power on state of the link.

In Example 11, the subject matter of Example 1 can optionally include denying a power off state of the link based on the determined power state.

In Example 12, the subject matter of Example 1 can optionally include allowing a power off state of the link based on the determined power state.

In Example 13, the subject matter of Example 1 can optionally include determining the condition includes determining a global idle condition of the first device.

Example 14 is an electronic system comprising: a first device, a second device, and a link between the first device and the second device, the first device to determine a condition of the first device, and to determine a power state of the link based on the determined condition of the first device.

In Example 15, the subject matter of Example 14 can optionally include the first device to determine an idle condition of the first device.

In Example 16, the subject matter of Example 14 and Example 15 can optionally include the first device to determine a power off state of the link based on the determined idle condition of the first device.

In Example 17, the subject matter of Example 14 can optionally include the first device to determine an active condition of at least one component of the first device.

In Example 18, the subject matter of Example 14 and Example 17 can optionally include the first device to determine a power on state of the link based on the determined active condition of at least one component of the first device.

In Example 19, the subject matter of Examples 14-18 can optionally include the link is a Peripheral Component Interconnect Express (PCIe) link between the first device and the second device.

In Example 20, the subject matter of Example 14 and Example 19 can optionally include the first device includes a processor.

In Example 21, the subject matter of Example 14 and Example 20 can optionally include the processor includes a microcontroller and a PCIe root complex device.

In Example 22, the subject matter of Example 14 and Example 21 can optionally include the PCIe root complex device to control the link based on the determined power state of the link.

In Example 23, the subject matter of Example 14 and Example 21 can optionally include the PCIe root complex device to receive, from the second device, a request for a specific link state.

In Example 24, the subject matter of Example 14 and Example 21 can optionally include the microcontroller to determine the condition of the first device.

In Example 25, the subject matter of Example 14 and Example 21 can optionally include the microcontroller to determine an idle condition of the first device.

In Example 26, the subject matter of Example 14 and Example 21 can optionally include the microcontroller to determine an active condition of at least one component of the first device.

In Example 27, the subject matter of Examples 14-26 can optionally include the power state of the link is a power off state of the link or a power on state of the link.

In Example 28, the subject matter of Example 14 can optionally include the first device to deny a power off state of the link based on the determined power state.

In Example 29, the subject matter of Example 14 can optionally include the first device to allow a power off state of the link based on the determined power state.

In Example 30, the subject matter of Example 14 can optionally include the first device to determine a global idle condition of the first device.

Example 31 is an electronic apparatus comprising: a first device to determine a condition of the first device, and to determine a power state of a link based on the determined condition of the first device.

In Example 32, the subject matter of Example 31 can optionally include the first device to determine an idle condition of the first device.

In Example 33, the subject matter of Example 31 and Example 32 can optionally include the first device to determine a power off state of the link based on the determined idle condition of the first device.

In Example 34, the subject matter of Example 31 can optionally include the first device to determine an active condition of at least one component of the first device.

In Example 35, the subject matter of Example 31 and Example 34 can optionally include the first device to determine a power on state of the link based on the determined active condition of at least one component of the first device.

In Example 36, the subject matter of Examples 31-35 can optionally include the link is a Peripheral Component Interconnect Express (PCIe) link between the first device and a second device.

In Example 37, the subject matter of Example 31 and Example 36 can optionally include the first device includes a processor.

In Example 38, the subject matter of Example 31 and Example 37 can optionally include the processor includes a microcontroller and a PCIe root complex device.

In Example 39, the subject matter of Example 31 and Example 38 can optionally include the PCIe root complex device to control the link based on the determined power state of the link.

In Example 40, the subject matter of Example 31 and Example 38 can optionally include the PCIe root complex device to receive, from the second device, a request for a specific link state.

In Example 41, the subject matter of Example 31 and Example 38 can optionally include the microcontroller to determine the condition of the first device.

In Example 42, the subject matter of Example 31 and Example 38 can optionally include the microcontroller to determine an idle condition of the first device.

In Example 43, the subject matter of Example 31 and Example 38 can optionally include the microcontroller to determine an active condition of at least one component of the first device.

In Example 44, the subject matter of Examples 31-43 the power state of the link is a power off state of the link or a power on state of the link.

In Example 45, the subject matter of Example 31 can optionally include the first device to deny a power off state of the link based on the determined power state.

In Example 46, the subject matter of Example 31 can optionally include the first device to allow a power off state of the link based on the determined power state.

In Example 47, the subject matter of Example 31 can optionally include the first device to determine a global idle condition of the first device.

Example 48 is a system having a link comprising: means for determining a condition of a first device coupled to the link, means for receiving, at the first device, a request for a specific link state from a second device coupled to the link, and means for determining a power state of the link based on the determined condition of the first device.

In Example 49, the subject matter of Example 48 can optionally include the means for determining the condition determines an idle condition of the first device.

In Example 50, the subject matter of Example 48 and Example 49 can optionally include the means for determining the power state determines a power off state of the link based on the determined idle condition of the first device.

In Example 51, the subject matter of Example 48 can optionally include the means for determining the condition determines an active condition of at least one component of the first device.

In Example 52, the subject matter of Example 48 and Example 51 can optionally include the means for determining the power state determines a power on state of the link based on the determined active condition of at least one component of the first device.

In Example 53, the subject matter of Examples 48-52 can optionally include the link is a Peripheral Component Interconnect Express (PCIe) link.

In Example 54, the subject matter of Example 48 and Example 53 can optionally include the first device includes a processor.

In Example 55, the subject matter of Example 48 and Example 54 can optionally include the processor includes a PCIe root complex device.

In Example 56, the subject matter of Examples 44-55 can optionally include means for controlling power to the link based on the determined power state of the link.

In Example 57, the subject matter of Examples 48-56 can optionally include The system of any one of examples 48-56, wherein the power state of the link is a power off state of the link or a power on state of the link.

In Example 58, the subject matter of Example 48 can optionally include means for denying a power off state of the link based on the determined power state.

In Example 59, the subject matter of Example 48 can optionally include means for allowing a power off state of the link based on the determined power state.

In Example 60, the subject matter of Example 48 can optionally include the means for determining the condition determines a global idle condition of the first device.

Example 61 is an electronic apparatus comprising: first logic, at least a portion of which is hardware, to determine a condition of a first device, and second logic, at least a portion of which is hardware, to determine a power state of a link based on the determined condition of the first device.

In Example 62, the subject matter of Example 61 can optionally include the first logic to determine an idle condition of the first device.

In Example 63, the subject matter of Example 61 and Example 62 can optionally include the second logic to determine a power off state of the link based on the determined idle condition of the first device.

In Example 64, the subject matter of Example 61 can optionally include the first logic to determine an active condition of at least one component of the first device.

In Example 65, the subject matter of Examples 61-64 can optionally include the second logic to determine a power on state of the link based on the determined active condition of at least one component of the first device.

In Example 66, the subject matter of Examples 61-65 can optionally include the link is a Peripheral Component Interconnect Express (PCIe) link.

In Example 67, the subject matter of Examples 61-66 can optionally include the power state of the link is a power off state of the link or a power on state of the link.

In Example 68, the subject matter of Example 61 can optionally include the second logic to deny a power off state of the link based on the determined power state.

In Example 69, the subject matter of Example 61 can optionally include the second logic to allow a power off state of the link based on the determined power state.

In Example 70, the subject matter of Example 61 can optionally include the first logic to determine a global idle condition of the first device.

Example 71 is a machine-readable medium comprising one or more instructions that when executed cause a processor to perform one or more operations to: determine a condition of a first device coupled to a link, and determine a power state of the link based on the determined condition of the first device.

In Example 72, the subject matter of Example 71 can optionally include the one or more operations to include to determine an idle condition of the first device.

In Example 73, the subject matter of Example 71 and Example 72 can optionally include the one or more operations to include to determine a power off state of the link based on the determined idle condition of the first device.

In Example 74, the subject matter of Example 71 can optionally include the one or more operations to include to determine an active condition of at least one component of the first device.

In Example 75, the subject matter of Example 71 and Example 74 can optionally include the one or more operations to include to determine a power on state of the link based on the determined active condition of at least one component of the first device.

In Example 76, the subject matter of Examples 71-75 can optionally include the link is a Peripheral Component Interconnect Express (PCIe) link.

In Example 77, the subject matter of Examples 71-76 can optionally include the one or more operations to include to control power to the link based on the determined power state of the link.

In Example 78, the subject matter of Examples 71-77 can optionally include the power state of the link is a power off state of the link or a power on state of the link.

In Example 79, the subject matter of Example 71 can optionally include the one or more operations to include to deny a power off state of the link based on the determined power state.

In Example 80, the subject matter of Example 71 can optionally include the one or more operations to include to allow a power off state of the link based on the determined power state.

In Example 81, the subject matter of Example 71 can optionally include the one or more operations to include to determine a global idle condition of the first device.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A non-transitory machine-readable medium comprising instructions that when executed cause a system on chip (SoC) coupled to a link to perform operations to:

identify a condition of a platform including I/O devices located externally from the SoC and further including at least one component of the SoC or another device coupled to the link, wherein the at least one component is located on the SoC, wherein to identify the condition includes at least one of to identify a first power state of the platform and to identify a second power state of the platform, wherein the second power state is greater than the first power state; and in response to receipt, by the SoC, of a request for a specific link state, the request originating from one of the I/O devices of the platform:

determine a first power state of the link based only on identification of the first power state of the platform; and determine a second power state of the link based only on identification of the second power state of the platform, wherein the second power state of the link is greater than the first power state of the link.

2. The non-transitory machine-readable medium of claim 1, wherein the first power state of the link comprises a power save state.

3. The non-transitory machine-readable medium of claim 2, wherein the second power state of the link comprises a power on state.

4. The non-transitory machine-readable medium of claim 1, wherein the at least one component comprises a first device and the another device coupled to the link comprises a second different device, the second different device located on the SoC.

5. The non-transitory machine-readable medium of claim 1, wherein to identify the second power state of the platform includes to identify a predefined operation mode of the at least one component.

6. The non-transitory machine-readable medium of claim 5, wherein to identify the second power state of the link is based on the identified predefined operation mode of the at least one component.

7. The non-transitory machine-readable medium of claim 5, wherein the identified predefined operation mode of the at least one component comprises an active condition.

8. The non-transitory machine-readable medium of claim 1, wherein the link is a Peripheral Component Interconnect Express (PCIe) link.

9. The non-transitory machine-readable medium of claim 1, wherein the first power state is associated with link reduction, and wherein the second power state corresponds to a greater number of active lanes than the first power state.

10. An electronic apparatus comprising:
first logic, at least a portion of which is hardware, to identify a condition of a platform including at least one component of a system on chip (SoC) and further including I/O devices located externally from the SoC, wherein the at least one component is located on the SoC, wherein the first logic to identify the condition includes at least one of the first logic to identify a first power state of the platform and the first logic to identify a second power state of the platform, wherein the second power state is greater than the first power state; and
second logic, at least a portion of which is hardware, to determine a first power state of a link in response to a request for a specific link state, the request originating from one of the I/O devices of the platform, the second logic to determine the first power state of the link based only on identification of the first power state of the platform, the second logic to determine a second power state of the link in response to the request for the specific link state, the second logic to determine the second power state of the link based only on identification of the second power state of the platform, wherein the second power state of the link is greater than the first power state of the link.

11. The electronic apparatus of claim 10, wherein the first power state of the link comprises a power save state.

12. The electronic apparatus of claim 11, wherein the second power state of the link comprises a power on state.

13. The electronic apparatus of claim 12, wherein the first logic to identify the second power state of the platform comprises the first logic to identify an active condition of the at least one component.

14. The electronic apparatus of claim 13, wherein the second power state of the link is determined based on the identified active condition of the at least one component.

15. The electronic apparatus of claim 10, wherein the link is a Peripheral Component Interconnect Express (PCIe) link.

16. The electronic apparatus of claim 10, wherein the at least one component comprises a component of a Platform Controller Hub (PCH) located on the SoC.

17. The electronic apparatus of claim 10, wherein the at least one component comprises a graphics component located on the SoC.

18. The electronic apparatus of claim 10, wherein the at least one component comprises a processor of the SoC.

19. The electronic apparatus of claim 10, wherein the at least one component comprises an I/O controller of the SoC.

20. An apparatus, comprising:
a power supply;
a system on chip (SoC) coupled to one or more downstream devices via one or more links, respectively, the one or more links powered by the power supply;
one or more I/O devices located externally to the SoC; and
a module to:
identify a condition of a platform including the one or more I/O devices located externally from the SoC and further including at least one component of the SoC, wherein the at least one component is located on the SoC, wherein identify the condition includes at least one of identify a first power state of the platform and identify a second power state of the platform, wherein the second power state is greater than the first power state;
determine a power on state of a link of the one or more links in response to a request for a specific link state, the request originating from an I/O device of the one or more I/O devices, wherein the determine the power on state of the link includes determine the power on state of the link based only on identification of the first power state of the platform; and
determine a power save state of the link of the one or more links in response to the request, including determine the power save state of the link based only on identification of the second power state of the platform.

21. The apparatus of claim 20, wherein the at least one component comprises a first device, and wherein at least one of the one or more downstream devices comprises a second different device, the second different device located on the SoC.

* * * * *